United States Patent
Nishimura

(10) Patent No.: US 7,373,074 B2
(45) Date of Patent: May 13, 2008

(54) VIDEO RECORDING APPARATUS

(75) Inventor: Masayoshi Nishimura, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 926 days.

(21) Appl. No.: 10/827,430

(22) Filed: Apr. 20, 2004

(65) Prior Publication Data
US 2004/0208478 A1 Oct. 21, 2004

(30) Foreign Application Priority Data
Apr. 21, 2003 (JP) ............... 2003-116256

(51) Int. Cl.
*H04N 5/91* (2006.01)
(52) U.S. Cl. ............... 386/46; 348/687; 360/25; 386/124
(58) Field of Classification Search ............... 386/46, 386/95, 124–126; 360/25, 27, 67; 348/678, 348/707
See application file for complete search history.

(56) References Cited

U.S. PATENT DOCUMENTS 5,528,379 A * 6/1996 Bhang ............... 386/93

FOREIGN PATENT DOCUMENTS

| JP | 1-303937 A | 12/1989 |
| JP | 2002-077817 | 3/2002 |
| JP | 2002-152649 A | 5/2002 |

OTHER PUBLICATIONS

Partial English translation of Japanese Office Action dated May 31, 2006.

* cited by examiner

*Primary Examiner*—Thai Q. Tran
*Assistant Examiner*—Mishawn Dunn
(74) *Attorney, Agent, or Firm*—Crowell & Moring LLP

(57) ABSTRACT

A video recording apparatus includes a tuner for receiving television broadcast waves, an intermediate frequency circuit for demodulating intermediate frequency (IF) signals outputted from the tuner into video signals, a video recorder for recording the video signals outputted from the intermediate frequency circuit on a recording medium, detecting means for detecting an IF AGC level or a level of noise contained in the video signals so as to detect radio field strength of an analog broadcast waves, and control means for setting of a recording mode defining a level of recording image quality at the video recorder. The control means output a mode setting signal to the video recorder in accordance with the radio field strength detected by the detecting means. The video recorder operates with the level of recording image quality dependent on the mode setting signal outputted from the control means. By such a configuration, recording can be performed in an appropriate mode, i.e., in a high quality image mode when the radio waves reception is good and in a low quality image mode when the radio waves reception is poor. Thus, the recording medium in the video recorder can be used efficiently.

5 Claims, 2 Drawing Sheets

VIDEO RECORDING APPARATUS

BACKGROUND OF THE INVENTION

1. Field of the Invention

The present invention relates to video recording apparatus which allow a level of recording image quality to be freely selected when receiving television broadcast waves for recording video signals contained therein.

2. Description of the Related Art

Video recording systems are known which receive and record analog television broadcasting signals. In such a conventional system, recording is performed with an image quality selected by a user regardless of a condition in the reception of radio waves. Thus, there may be a case where the system records signals in a high quality image mode although it has poor reception of radio waves. Further, a video recording apparatus for recording digital television broadcasting signals is known which detects data on a maximum bit rate in digital signals, determines a recording rate based on the detection, and records the signals at the recording rate (see, for example, Japanese laid-open patent publication No. 2002-77817).

However, the conventional system which records analog broadcasting signals may record signals in a high quality image mode even in circumstances when it is unnecessary to perform recording in the high quality image mode, i.e., when it is sufficient to perform recording in a low quality image mode. This may result in inefficient use of recording area in a recording medium, e.g., a hard disk, in the video recorder. Further, the technique disclosed in the above mentioned patent publication is not applicable to analog broadcasts which do not contain data on the bit rate.

SUMMARY OF THE INVENTION

The present invention has been made to solve the above mentioned problems, and an object of the present invention is to provide a video recording apparatus which can, when receiving television broadcast waves for recording video signals contained therein, automatically select a recording mode defining a level of recording image quality depending on a condition in the reception of radio waves, thus enabling efficient use of a recording medium in the video recorder.

An aspect of the present invention provides a video recording apparatus comprising: a tuner for receiving a television broadcast wave; an intermediate frequency circuit for demodulating intermediate frequency signals outputted from the tuner into video signals; a video recorder for recording the video signals outputted from the intermediate frequency circuit on a recording medium; detecting means for detecting radio field strength of an analog broadcast wave; and control means for outputting a mode setting signal for setting of a recording mode defining a level of recording image quality at the video recorder thereto in accordance with the radio field strength detected by the detecting means, wherein the video recorder operates with the level of recording image quality dependent on the mode setting signal outputted from the control means.

By this configuration, the detecting means detect the radio field strength of the broadcast wave, the control means output a signal for setting a recording mode in accordance with the detection, and the video recorder operates with the level of recording image quality dependent on the mode setting signal. Therefore, recording can be performed in a mode appropriate to the radio field strength of the broadcast wave, i.e., in a high quality image mode when the radio waves reception is good, and in a low quality image mode when the radio waves reception is poor. This can result in efficient use of recording medium in the video recorder.

Preferably, the detecting means detect an automatic gain control (AGC) level of intermediate frequency signals outputted from the tuner so as to detect the radio field strength of the broadcast wave. Alternatively, the detecting means detect a level of noise contained in the video signals. This allows the radio field strength of analog broadcast waves to be detected with relatively simple configuration.

Preferably, the control means allow a user to freely select one of recording modes, and the selectable recording modes include an automatic mode in which an appropriate recording mode is automatically selected in accordance with the level detected by the detecting means. By this configuration, when the automatic mode is selected, the control means allow recording to be performed in an automatically selected mode appropriate to the radio field strength of the broadcast wave, i.e., in a high quality image mode when the radio waves reception is good and in a low quality image mode when the radio waves reception is poor.

DETAILED DESCRIPTION OF THE PREFERRED EMBODIMENT

Figure 1:
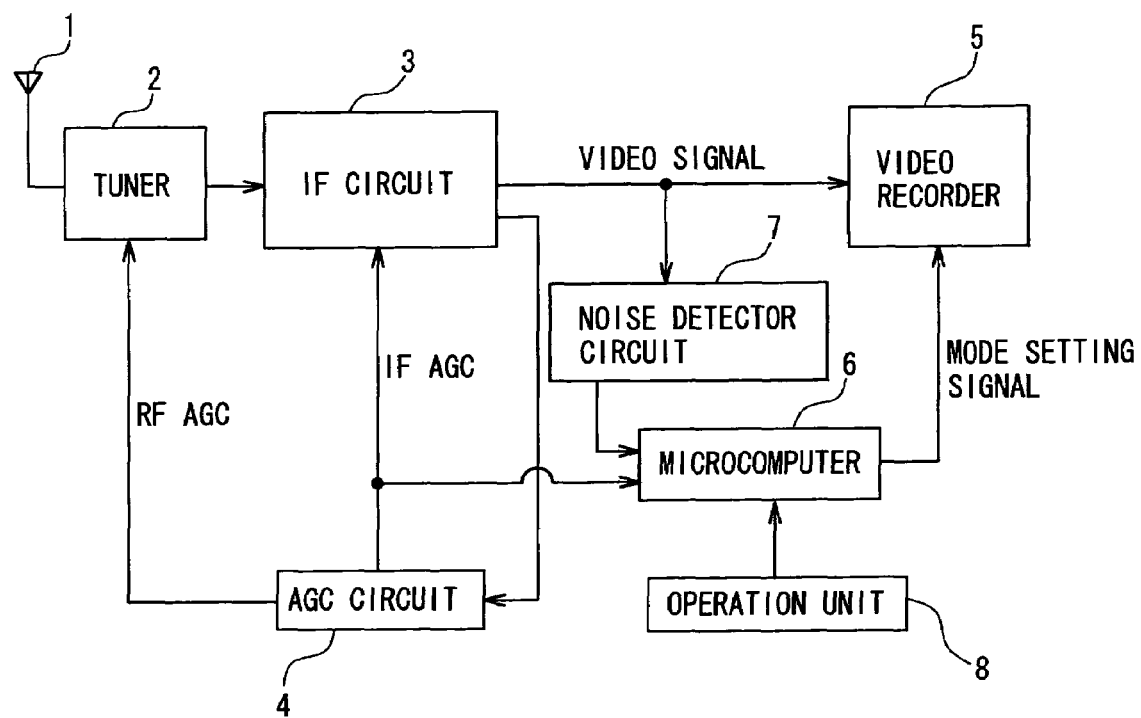
FIG. 1 is a block diagram of a video recording apparatus according to one embodiment of the present invention.

Referring now to the accompanying drawings, a video recording apparatus embodying the present invention will be described. FIG. 1 is a block diagram of the video recording apparatus according to this embodiment. This video recording apparatus includes, as a front end, a tuner 2 for selecting signals on a channel specified by a channel selection from radio frequency (RF) signals received by an antenna 1, for amplifying the selected signals, and for converting the signals to intermediate frequency (IF) signals for output, an IF circuit 3 for amplifying the IF signals and demodulating the signals for output as composite TV signals, and an automatic gain control (AGC) circuit 4 for outputting a RF AGC voltage and an IF AGC voltage for control of the amplifications at the tuner 2 and the IF circuit 3, respectively. The antenna 1 receives RF signals contained in analog television broadcast waves.

The video recording apparatus further includes a video recorder 5 for recording video signals outputted from the IF circuit 3, a controlling microcomputer 6 for outputting a mode setting signal to the video recorder 5, a known noise detector circuit 7 for detecting the level of noise contained in the video signals, and an operation unit 8 for a user to input an operation command to the microcomputer 6. Used as the video recorder 5 is a hard disk, a videocassette recorder (VCR), or the like.

The tuner 2 includes a tuning circuit for selecting signals on a channel specified by an inputted channel selection out of RF signals received through the antenna 1 and for outputting the selected signals, a RF amplifier circuit for amplifying the output signals from the tuning circuit with the amplification regulated by an RF AGC voltage applied, and a frequency conversion circuit for converting the output signals from the RF amplifier circuit into IF signals of a predetermined intermediate frequency for output. The IF circuit 3 includes an IF amplifier circuit for amplifying the output signals from the frequency conversion circuit with the amplification regulated by an IF AGC voltage and an IF demodulator circuit for demodulating the output signals from the IF amplifier circuit for output.

The microcomputer 6 allows a user not only to freely select a recording mode of the video recorder 5 from high quality image, standard, and low quality image modes but also to select an automatic mode in which an appropriate recording mode is automatically selected. When the automatic mode is selected, the microcomputer 6 receives the IF AGC voltage from the AGC circuit 4 and the noise level from the noise detector circuit 7 to output a mode setting signal. The IF AGC voltage received from the AGC circuit 4 and the noise level received from the noise detector circuit 7 vary depending on a condition in the reception of radio waves. Therefore, by outputting the mode setting signal in accordance with the voltage and the noise level, recording can be performed in an appropriate mode automatically selected, i.e., in the high quality image mode when the radio waves reception is good and in the low quality image mode when the radio waves reception is poor. The condition in the reception of radio waves may be detected by detecting both the IF AGC voltage and the noise level from the noise detector circuit 7 or by detecting either of the two.

Figure 2:
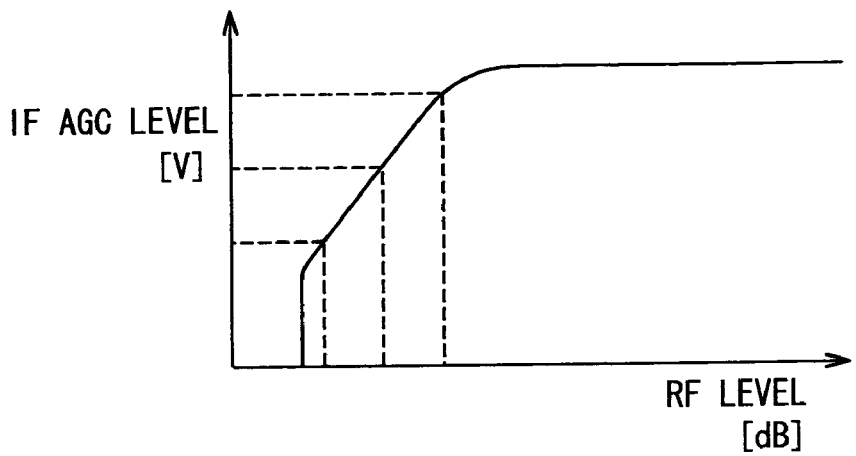
FIG. 2 is a graph showing the relation between a RF level and an IF AGC level.

FIG. 2 shows the IF AGC level relative to the RF level. It will be appreciated from this graph that appropriate setting of a recording mode in accordance with the IF AGC level results in the setting in accordance with the RF level, i.e., on the condition in the reception of radio waves.

Figure 3:
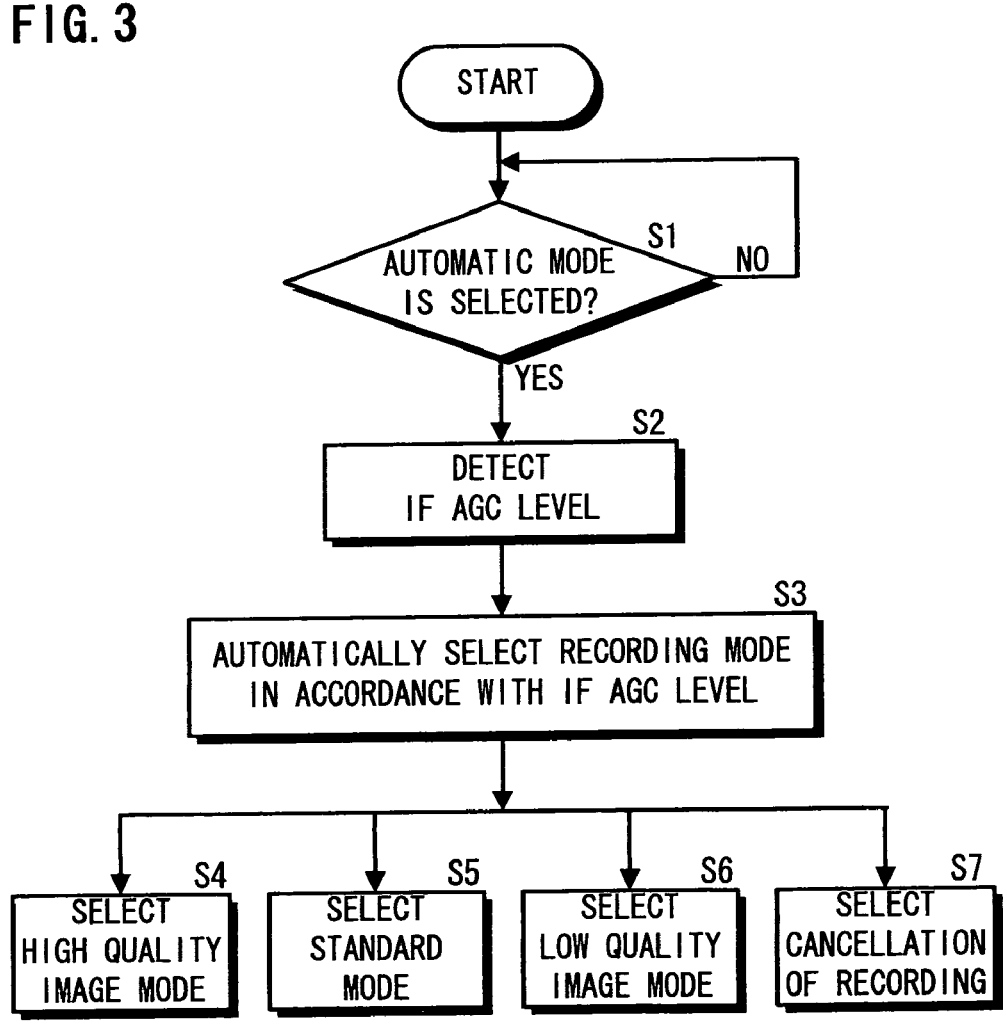
FIG. 3 is a flowchart showing the steps executed by a microcomputer in the apparatus.

FIG. 3 is a flowchart illustrating the steps executed by the microcomputer 6. Explained is an embodiment in which the IF AGC voltage is detected. If the automatic mode is selected for recording (YES at step 1), the microcomputer 6 detects the IF AGC level (step 2) and automatically selects an appropriate recording mode in accordance with the IF AGC level (step 3). Either one is selected among a high quality image mode (step 4), a standard mode (step 5), or a low quality image mode (step 6), and a cancellation of recording (step 7). Cancellation of recording is selected when the reception of radio waves is considerably poor. Accordingly, the system can perform recording in a mode appropriate to the radio field strength of broadcast waves, i.e., in the high quality image mode when the radio waves reception is good and in the low quality image mode when the radio waves reception is poor, thus allowing the recording medium in the video recorder to be used efficiently.

As described above, a condition in the reception of radio waves is detected by using the IF AGC voltage from the AGC circuit 4 and/or the noise level from the noise detector circuit 7. This allows the radio field strength of analog broadcast waves to be detected with a relatively simple configuration.

This application is based on Japanese patent application 2003-116256 filed in Japan dated Apr. 21, 2003, the contents of which are hereby incorporated by references.

Although the present invention has been described above using a presently preferred embodiment, those skilled in the art will appreciate that various modifications are possible. Accordingly, all such modifications are intended to be included within the sprit and scope of the present invention. For example, the condition in the reception of radio waves may be detected by using other signals equivalent to the one in the above embodiment.

What is claimed is:

1. A video recording apparatus comprising:
   a tuner for receiving a television broadcast wave;
   an intermediate frequency circuit for demodulating intermediate frequency signals outputted from the tuner into video signals;
   a video recorder for recording the video signals outputted from the intermediate frequency circuit on a recording medium;
   detecting means for detecting radio field strength of an analog broadcast wave; and
   control means for outputting a mode setting signal for setting of a recording mode defining a level of recording image quality at the video recorder thereto in accordance with the radio field strength detected by the detecting means,
   wherein the video recorder operates with the level of recording image quality dependent on the mode setting signal outputted from the control means.

2. The video recording apparatus according to claim 1, wherein the detecting means detect an automatic gain control (AGC) level of intermediate frequency signals outputted from the tuner.

3. The video recording apparatus according to claim 2, wherein the control means allow a user to freely select one of recording modes, and the selectable recording modes include an automatic mode in which an appropriate recording mode is automatically selected in accordance with the level detected by the detecting means.

4. The video recording apparatus according to claims 1, wherein the detecting means detect a level of noise contained in the video signals.

5. The video recording apparatus according to claim 4, wherein the control means allow a user to freely select one of recording modes, and the selectable recording modes include an automatic mode in which an appropriate recording mode is automatically selected in accordance with the level detected by the detecting means.

* * * * *